United States Patent Office 2,854,474
Patented Sept. 30, 1958

2,854,474

1,12 - DIMETHYL - 6 - HYDROXY - 7 - ACYL - 9 - OXO - 1,2,3,4,9,10,11,12 - OCTAHYDROPHENANTHRENE - 1 - CARBOXYLIC ACIDS AND DERIVATIVES THEREOF

Roy H. Bible, Jr., Morton Grove, Ill., assignor to G. D. Searle & Co., Chicago, Ill., a corporation of Delaware No Drawing. Application July 19, 1956
Serial No. 598,764

12 Claims. (Cl. 260—468.5)

The present invention relates to polyhydrophenanthrene compounds, and is specifically concerned with 1,12 - dimethyl-6-hydroxy-7-acyl-9-oxo-1,2,3,4,9,10,11,12-octahydrophenanthrene-1-carboxylic acids and with ethers and esters thereof. The compounds of the present invention can be represented by the structural formula

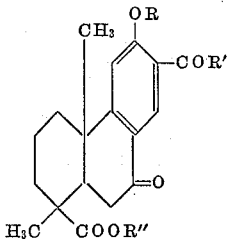

wherein R can represent hydrogen or a lower alkyl radical, R' can represent a lower alkyl radical or an aromatic radical containing fewer than 9 carbon atoms, and R" can represent hydrogen or a lower alkyl radical.

The lower alkyl radicals which R, R', and R" can represent can be selected from among such radicals as methyl, ethyl, propyl, butyl, amyl, hexyl, heptyl, octyl, and branched-chain isomers thereof.

When the term R' in the foregoing structural formula is an aromatic radical containing fewer than 9 carbon atoms, it can represent an aromatic hydrocarbon radical such as phenyl, methylphenyl, dimethylphenyl or ethylphenyl. It can also represent an aromatic halohydrocarbon radical such as chlorophenyl, bromophenyl, iodophenyl, dichlorophenyl, tribromophenyl, and similarly halogenated methylphenyl, dimethylphenyl, and ethylphenyl radicals. In addition, it can represent an alkoxyhydrocarbon radical such as methoxyphenyl, dimethoxyphenyl, ethoxyphenyl, and methoxymethylphenyl, a common feature of the foregoing aromatic radicals being that they contain fewer than 9 carbon atoms.

This is a continuation-in-part of my copending application Serial No. 347,165, filed April 6, 1953, now U. S. Patent 2,759,014.

The compounds of the present invention can be manufactured from such readily available resin acid derivatives as methyl O-methylpodocarpate and ethyl O-ethylpodocarpate. Illustrative of a general method of operation, an alkyl O-alkylpodocarpate of the structural formula

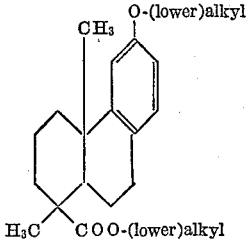

is subjected to an aluminum chloride-catalyzed condensation with an acyl chloride of the structural formula R'COCl R' being defined as hereinbefore, and the resulting 7-acyl substitution product is separated and oxidized in a reaction medium comprising chromium trioxide and aqueous acetic acid, whereby the 9-oxo derivative results.

Upon treatment of the resulting alkyl ester of 1,12-dimethyl-6-alkoxy-7-acyl-9-oxo - 1,2,3,4,9,10,11,12 - octahydrophenanthrene-1-carboxylic acid with pyridine hydrochloride as set forth in detail hereinafter, there occurs cleavage of the ether and ester groups with the formation of a 1,12-dimethyl-6-hydroxy-7-acyl-9-oxo-1,2,3,4,9,10,11,12-octahydrophenanthrene-1-carboxylic acid. Selective hydrolysis of the 6-alkoxy or the 1-alkoxycarbonyl group can also be achieved. By treatment in a refluxing solution of hydrobromic acid and acetic acid the ether function is preferentially hydrolyzed; whereas treatment with hot, concentrated sulfuric acid followed by dilution with water causes preferential hydrolysis of the ester function.

The compounds of the present invention have valuable pharmacological properties. Specifically, they are potent anti-hypertensive agents, and are consequently useful in the treatment of states of elevated blood pressure.

The alkyl esters of 1,12-dimethyl-6-alkoxy-7-aroyl-1,2,3,4,9,10,11,12-octahydrophenanthrene - 1 - carboxylic acid, wherein the aroyl group is a benzoyl radical or substituted benzoyl radical as disclosed here in as intermediates in the manufacture of the claimed 9-oxo compositions, also have useful biological properties. They are anti-inflammatory agents, effective in the treatment of inflammation of the iris. They also have anti-bacterial properties, exhibited, for example, against B. subtilis and E. coli.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

Example 1

To a solution of 5 parts of methyl O-methyl-7-acetylpodocarpate in 53 parts of acetic acid maintained at about 5–10° C. there is gradually added a solution of 3.16 parts of chromium trioxide in 1.5 parts of water and 6 parts of acetic acid. Stirring is continued for 30 minutes after the addition is complete, and the mixture is then allowed to stand at about 5–10° C. for 48 hours and at about 25° C. for 72 hours. Unreacted chromium trioxide is decomposed by the addition of ethanol, and the mixture is diluted with several times its volume of water. When separation of the insoluble product is complete, it is collected on a filter and washed. Recrystallization from a mixture of methanol and ethyl acetate affords the purified methyl ester of 1,12-dimethyl-6-methoxy - 7 - acetyl - 9-oxo-1,2,3,4,9,10,11,12-octahydrophenanthrene-1-carboxylic acid melting at about 248–249.5° C. This compound has the structural formula

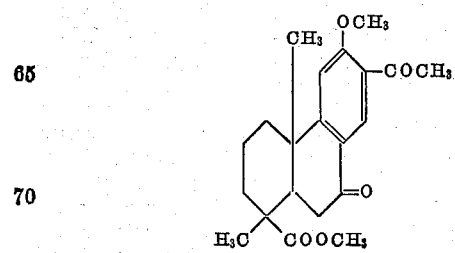

Example 2

A solution of 2 parts of the methyl ester of 1,12-dimethyl - 6 - methoxy - 7 - acetyl - 9 - oxo - 1,2,3,4,9,10,11,12-octahydrophenanthrene-1-carboxylic acid in 40 parts of redistilled pyridine hydrochloride is heated under reflux for 10 minutes and then poured into about 300 parts of water with stirring. The insoluble product is collected on a filter and washed with hot water. Purification by successive crystallizations from aqueous methanol, from aqueous acetic acid, and from aqueous methanol yields purified 1,12 - dimethyl - 6 - hydroxy-7-acetyl - 9 - oxo - 1,2,3,4,9,10,11,12 - octahydrophenanthrene-1-carboxylic acid. The compound obtained in this manner melts at about 164–167° C., resolidifies, and remelts at about 182–186° C. This compound has the structural formula

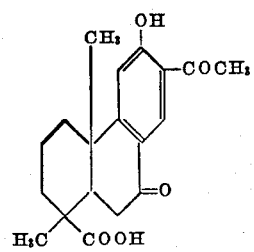

Example 3

To a stirred mixture of 83 parts of methyl O-methylpodocarpate and 450 parts of chlorobenzene, maintained at about 10–15° C., there is added a total of 75 parts of aluminum chloride in several portions over a 10 minute period. There is then added over a 30 minute period a solution of 42 parts of benzoyl chloride in 40 parts of chlorobenzene. The mixture is allowed to warm to room temperature gradually and is then allowed to stand at about 25° C. for 18 hours, after which it is poured into several times its volume of ice water which has been acidified with hydrochloric acid. The resulting mixture is distilled under reduced pressure until almost all of the chlorobenzene is removed, after which it is extracted with several portions of ether. The combined ether extract is washed with 10% hydrochloric acid, with water, with 10% sodium hydroxide solution, and finally with several portions of water, after which it is concentrated to dryness. By several crystallizations of the non-volatile residue from aqueous acetic acid and then from aqueous methanol there is obtained the methyl ester of 1,12-dimethyl-6-methoxy-7 - benzoyl - 1,2,3,4,9,10,11,12 - octahydrophenanthrene-1-carboxylic acid which melts at about 114–119° C. and has the structural formula

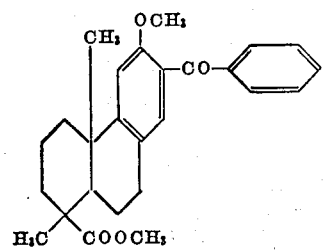

Example 4

To a stirred solution of 10 parts of the methyl ester of 1,12 - dimethyl - 6 - methoxy - 7 - benzoyl - 1,2,3,4,9,10,11,12-octahydrophenanthrene-1-carboxylic acid in 105 parts of acetic acid maintained at about 10–20° C., there is gradually added a solution of 5.2 parts of chromium trioxide in 4 parts of water and 12 parts of acetic acid. The mixture is stirred for an additional hour at 10–20° C. and then allowed to stand at about 25° C. for 72 hours. The mixture is poured into 500 parts of water, with stirring, and the insoluble product is collected on a filter and washed with water. Purification by recrystallization from aqueous methanol yields the methyl ester of 1,12-dimethyl-6-methoxy-7-benzoyl-9 - oxo - 1,2,3,4,9,10,11,12 - octahydrophenanthrene - 1-carboxylic acid. This compound melts at about 174–176° C. and has the structural formula

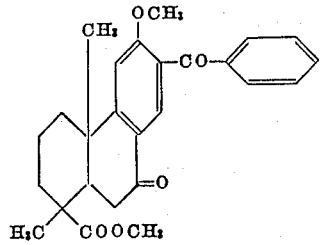

Example 5

By the procedure of Example 3, with the substitution of 50 parts of o-ethylbenzoyl chloride for the benzoyl chloride, there is obtained the methyl ester of 1,12-dimethyl - 6 - methoxy - 7 - (o - ethylbenzoyl) - 1,2,3,4,9,10,11,12 - octahydrophenanthrene - 1 - carboxylic acid. Upon oxidation of 10 parts of this compound with chromium trioxide in aqueous acetic acid according to the procedure of Example 4, there results the methyl ester of 1,12 - dimethyl-6-methoxy-7-(o-ethylbenzoyl)-9-oxo - 1,2,3,4,9,10,11,12 - octahydrophenanthrene - 1-carboxylic acid of the structural formula

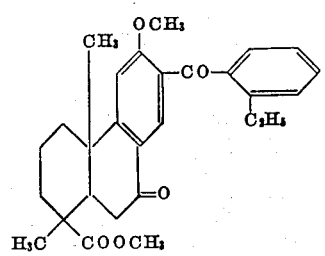

Example 6

To a stirred mixture of 30 parts of methyl O-methylpodocarpate in 110 parts of chlorobenzene maintained at about 10–15° C. There is added 27 parts of aluminum chloride over a 10 minute period followed by a solution of 35 parts of p-chlorobenzoyl chloride and 15 parts of chlorobenzene over a 30 minute period. The mixture is allowed gradually to warm to room temperature and then to stand for about 18 hours, after which it is poured into several times its volume of acidified ice water. Most of the chlorobenzene is removed by distillation under reduced pressure, and the remaining mixture is extracted with several portions of ether. The combined ethereal extract is washed with 10% hydrochloric acid, with water, with 10% sodium hydroxide solution, and with several portions of water, and is then concentrated to dryness. By two crystallizations of the nonvolatile residue from mixtures of ethyl acetate and petroleum ether there is obtained the methyl ester of 1,12-dimethyl-6-methoxy-7 - (p - chlorobenzoyl) - 1,2,3,4,9,10,11,12 - octahydrophenanthrene-1-carboxylic acid which melts at about 140–144° C. and has the structural formula

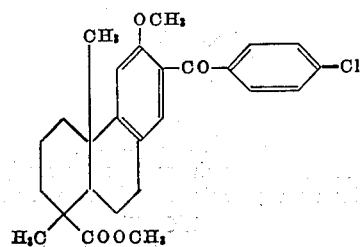

Example 7

To a solution of 5 parts of the methyl ester of 1,12-dimethyl - 6 - methoxy - 7 - (p - chlorobenzoyl) - 1,2,3,4,9,10,11,12-octahydrophenanthrene-1-carboxylic acid in 105 parts of acetic acid maintained at about 10° C. there is gradually added a solution of 2.2 parts of chromium trioxide in 1 part of water and 4 parts of acetic acid. The mixture is then allowed slowly to warm to room temperature and is maintained at this temperature for about 24 hours, after which it is poured into several times its volume of water. The insoluble product is collected and recrystallized from mixtures of chloroform and methanol to afford the purified methyl ester of 1,12-dimethyl-6-methoxy - 7 - (p - chlorobenzoyl) - 9 - oxo - 1,2,3,4,9,10,11,12-octahydrophenanthrene-1-carboxylic acid melting at about 262–264° C. It has the structural formula

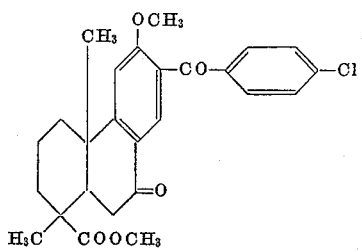

Example 8

Substitution of 62 parts of 2,5-dibromo-4-methyl-benzoyl chloride for the p-chlorobenzoyl chloride in the procedure of Example 6, and oxidation of the resulting methyl ester of 1,12-dimethyl-6-methoxy-7-(2,5-dibromo-4 - methylbenzoyl) - 1,2,3,4,9,10,11,12 - octahydrophenanthrene-1-carboxylic acid with chromium trioxide in aqueous acetic acid according to the process described in Example 7, yields the methyl ester of 1,12-dimethyl-6-methoxy - 7 - (2,5 - dibromo - 4 - methylbenzoyl) - 9-oxo - 1,2,3,4,9,10,11,12 - octahydrophenanthrene - 1 - carboxylic acid of the structural formula

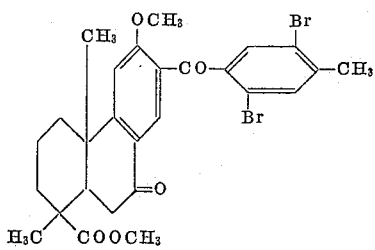

Example 9

To a stirred mixture of 30 parts of methyl O-methylpodocarpate and 110 parts of chlorobenzene maintained at 10–15° C. there is added 27 parts of aluminum chloride over a 10 minute period followed by a solution of 34 parts of o-methoxybenzoyl chloride and 15 parts of chlorobenzene over a 30 minute period. Stirring is continued for 3 hours while the mixture is gradually allowed to warm to room temperature. It is then maintained at about 25° C. for 18 hours, after which it is poured into several times its volume of acidified ice water. Almost all of the chlorobenzene is removed by distillation under reduced pressure, and the remaining mixture is extracted with several portions of ether. The ethereal extract is washed successively with 10% hydrochloric acid, with water, with 10% sodium hydroxide solution, and with several portions of water, after which it is concentrated to dryness. The residue is crystallized from aqueous methanol to afford the methyl ester of 1,12-dimethyl-6-methoxy - 7 - (o - methoxybenzoyl) - 1,2,3,4,9,10,11,12-octahydrophenanthrene-1-carboxylic acid melting at about 118–121° C. The structural formula is

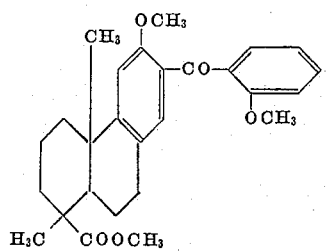

Example 10

To a solution of 5 parts of the methyl ester of 1,12-dimethyl - 6 - methoxy - 7 - (o - methoxybenzoyl) - 1,2,3,4,9,10,11,12 - octahydrophenanthrene - 1 - carboxylic acid in 55 parts of acetic acid maintained at about 10° C. there is gradually added a solution of 2.2 parts of chromium trioxide in 1 part of water and 4 parts of acetic acid. The mixture is allowed to warm slowly to room temperature and is then maintained at about 25° C. for 18 hours, after which it is poured into several times its volume of water. By crystallization of the precipitated product from aqueous methanol there is obtained the methyl ester of 1,12-dimethyl-6-methoxy-7-(o-methoxybenzoyl) - 9 - oxo - 1,2,3,4,9,10,11,12 - octahydrophenanthrene-1-carboxylic acid which melts at about 175–176° C. and has the structural formula

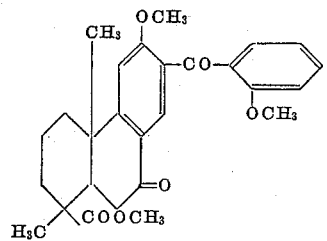

Example 11

By the substitution of 36 parts of p-ethoxybenzoyl chloride for the o-methoxybenzoyl chloride in the procedure of Example 9, there is obtained the methyl ester of 1,12-dimethyl-6-methoxy-7 - (p - ethoxybenzoyl) - 1,2,3,4,9,10,11,12-octahydrophenanthrene-1-carboxylic acid. Oxidation of 5 parts of this compound with chromium trioxide in aqueous acetic acid according to the procedure of Example 10 affords the methyl ester of 1,12-dimethyl-6-methoxy-7-(p-ethoxybenzoyl)-9 - oxo - 1,2,3,4,9,10,11,12-octahydrophenanthrene-1-carboxylic acid of the structural formula

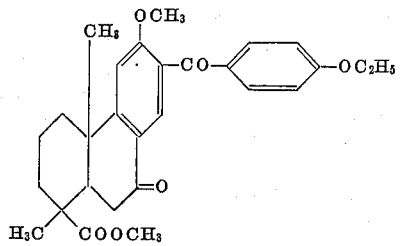

Example 12

Diethyl sulfate (46.2 parts) is added, with stirring, to a solution of 27.4 parts of podocarpic acid and 12.8 parts of sodium hydroxide in 50% aqueous ethanol, and the resulting mixture is boiled for 5 minutes, and allowed to cool. The precipitated ethyl O-ethylpodocarpate is collected on a filter and washed with dilute sodium carbonate solution and with water. The ethyl O-ethylpodocarpate is dried thoroughly in a vacuum desiccator. A solution prepared from 19.7 parts of this product and 13.5 parts of butyryl chloride in 250 parts of nitrobenzene is cooled to 0° C. and treated with 16.2 parts of aluminum chloride added in several portions over a period of 1 hour. The mixture is stirred at 0° C. for an additional 3 hours, and then allowed to stand at 0–5° C. for 100 hours and finally at about 20° C. for 5 hours. The mixture is then stirred with ice and dilute hydrochloric acid. The nitrobenzene phase is separated, washed with several portions of water and distilled with steam until the organic solvent is removed. The remaining aqueous suspension is extracted with ethyl acetate, and the ethyl acetate solution is washed with water and concentrated to dryness under reduced pressure. The non-volatile residue consists substantially of ethyl O-ethyl-7-butyrylpodocarpate. A solution of 5 parts of this crude product in 105 parts of acetic acid maintained at about 5–10° C. is treated by the gradual addition of a solution of 3.16 parts of chromium trioxide in 1.5 parts of water and 6 parts of acetic acid. The mixture is allowed gradually to warm to room temperature and then is maintained at about 20–25° C. for 24 hours. The mixture is then poured into several times its volume of water, and the precipitated product is collected and crystallized from aqueous methanol. There is thus obtained the ethyl ester of 1,12-dimethyl-6-ethoxy-7-butyryl-9-oxo-1,2,3,4,9,10,11,12-octahydrophenanthrene-1-carboxylic acid which shows ultraviolet absorption maxima at 244 millimicrons with a molecular extinction coefficient of about 29,000, and at 274 millimicrons with a molecular extinction coefficient of about 15,000. It has the structural formula

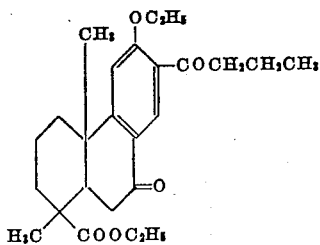

*Example 13*

A solution of 1 part of the methyl ester of 1,12-dimethyl-6-methoxy-7-acetyl-9-oxo-1,2,3,4,9,10,11,12-octahydrophenanthrene-1-carboxylic acid in 16 parts of concentrated sulfuric acid is heated at about 80° C. for 4 minutes, during which time there occurs an evolution of sulfur dioxide. The hot solution is poured with stirring, into several times its volume of water and the precipitated solid is collected on a filter and then extracted with 5% sodium hydroxide solution. This basic extract is filtered, and the filtrate is poured into hot 10% hydrochloric acid, whereby there is obtained a precipitate of 1,12-dimethyl-6-methoxy-7-acetyl-9-oxo-1,2,3,4,9,10,11,12-octahydrophenanthrene-1-carboxylic acid. Upon crystallization from a mixture of water and methanol this compound melts at about 195–196.5° C. It has the structural formula

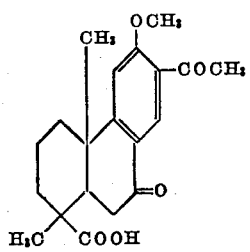

What is claimed is:
1. A compound of the structural formula

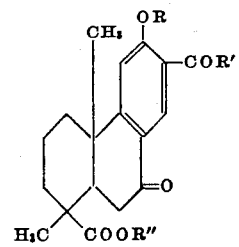

wherein R is a member of the group consisting of hydrogen and lower alkyl radicals; R' is a member of the group consisting of lower alkyl radicals, monocyclic aromatic hydrocarbon radicals containing fewer than 9 carbon atoms, monocyclic aromatic halohydrocarbon radicals containing fewer than 9 carbon atoms, and monocyclic aromatic alkoxyhydrocarbon radicals containing fewer than 9 carbon atoms; and R" is a member of the group consisting of hydrogen and lower alkyl radicals.

2. A compound of the structural formula

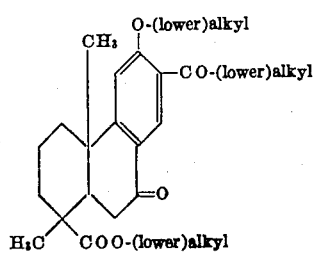

3. Lower alkyl ester of 1,12-dimethyl-6-methoxy-7-acetyl-9-oxo-1,2,3,4,9,10,11,12 - octahydrophenanthrene-1-carboxylic acid.

4. Methyl ester of 1,12-dimethyl-6-methoxy-7-acetyl-9-oxo-1,2,3,4,9,10,11,12-octahydrophenanthrene - 1 - carboxylic acid.

5. A compound of the structural formula

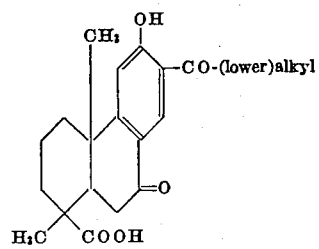

6. 1,12 - dimethyl - 6 - hydroxy - 7 - acetyl - 9 - oxo-1,2,3,4,9,10,11,12-octahydrophenanthrene - 1 - carboxylic acid.

7. A compound of the structural formula

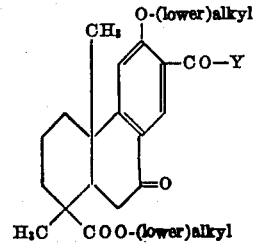

wherein Y is a monocyclic aromatic hydrocarbon radical containing fewer than 9 carbon atoms.

8. Methyl ester of 1,12-dimethyl-6-methoxy-7-benzoyl-9-oxo-1,2,3,4,9,10,11,12-octahydrophenanthrene - 1 - carboxylic acid.

9. A compound of the structural formula

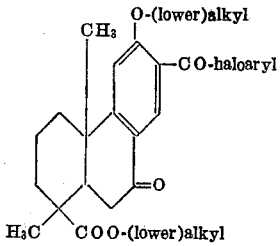

wherein the haloaryl radical is a monocyclic aromatic halohydrocarbon radical containing fewer than 9 carbon atoms.

10. Methyl ester of 1,12-dimethyl-6-methoxy-7-(p-chlorobenzoyl) - 9 - oxo - 1,2,3,4,9,10,11,12 - octahydrophenanthrene-1-carboxylic acid.

11. A compound of the structural formula

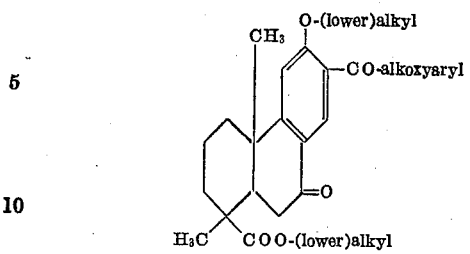

wherein the alkoxyaryl radical is a monocyclic aromatic alkoxyhydrocarbon radical containing fewer than 9 carbon atoms.

12. Methyl ester of 1,12-dimethyl-6-methoxy-7-(o-methoxybenzoyl)-9-oxo - 1,2,3,4,9,10,11,12, - octahydrophenanthrene-1-carboxylic acid.

References Cited in the file of this patent

UNITED STATES PATENTS

| | | |
|---|---|---|
| 2,750,373 | Bible | June 12, 1956 |
| 2,750,407 | Ritchie | June 12, 1956 |
| 2,759,014 | Bible | Aug. 14, 1956 |
| 2,767,162 | Picha | Oct. 16, 1956 |